United States Patent
Morin

(10) Patent No.: US 11,822,461 B2
(45) Date of Patent: Nov. 21, 2023

(54) REMOTE DEBUGGING OF CLOUD APPLICATION

(71) Applicant: SAP SE, Walldorf (DE)

(72) Inventor: Arley Triana Morin, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/453,902

(22) Filed: Nov. 8, 2021

(65) Prior Publication Data

US 2023/0153228 A1  May 18, 2023

(51) Int. Cl.
    G06F 11/36    (2006.01)
    H04L 67/141   (2022.01)
    H04L 9/40     (2022.01)

(52) U.S. Cl.
    CPC ........ *G06F 11/3664* (2013.01); *G06F 11/362* (2013.01); *H04L 63/166* (2013.01); *H04L 67/141* (2013.01)

(58) Field of Classification Search
    CPC .. G06F 11/3664; G06F 11/362; H04L 63/166; H04L 67/141
    USPC .................................................. 717/124–141
    See application file for complete search history.

(56) References Cited

U.S. PATENT DOCUMENTS

| | | | | |
|---|---|---|---|---|
| 7,533,271 B2* | 5/2009 | Laksono | ................. | H04L 43/00 713/184 |
| 8,327,337 B2* | 12/2012 | Barsness | ............... | G06F 11/362 717/124 |
| 8,972,953 B2* | 3/2015 | Tamm | ..................... | H04L 67/10 717/124 |
| 9,170,922 B1* | 10/2015 | Lachwani | ........... | G06F 11/3664 |
| 9,262,300 B1* | 2/2016 | Haba | ...................... | G06F 11/362 |
| 9,448,769 B1* | 9/2016 | Katoch | ............... | G06F 11/3668 |
| 9,471,466 B1* | 10/2016 | Garcia | ............... | G06F 11/3644 |
| 9,632,913 B2* | 4/2017 | Deakin | ............... | G06F 9/45558 |
| 9,632,915 B2* | 4/2017 | Davis | ................. | G06F 11/3612 |
| 9,652,364 B1* | 5/2017 | Kaila | ................... | G06F 11/366 |
| 9,756,061 B1* | 9/2017 | Roeh | .................... | H04L 63/1408 |

(Continued)

OTHER PUBLICATIONS

Ozcan et al, "Remote Debugging for Containerized Applications in Edge Computing Environments", IEEE, pp. 30-32 (Year: 2019).*

(Continued)

*Primary Examiner* — Anil Khatri
(74) *Attorney, Agent, or Firm* — Buckley, Maschoff & Talwalkar LLC

(57) ABSTRACT

Provided are systems and methods for remotely debugging a software application hosted on a cloud platform. Rather than download and test code locally, a developer may login directly to the cloud platform, and debug the software application in its native cloud environment. In one example, the method may include establishing a communication channel between a remote computing terminal and an application instance hosted on a cloud platform, enabling port forwarding at the remote computing terminal to redirect requests from the remote computing terminal to the application instance hosted on the cloud platform via the communication channel, attaching a debugger to a port at the remote computing terminal that is associated with the communication channel, and forwarding, via the debugger, debugging commands input at the remote computing terminal to the application instance hosted on the cloud platform via the communication channel.

20 Claims, 6 Drawing Sheets

(56) References Cited

U.S. PATENT DOCUMENTS

| | | | |
|---|---|---|---|
| 10,628,288 B2* | 4/2020 | Barsness | G06F 11/3636 |
| 10,691,581 B1* | 6/2020 | Whitcher | G06F 11/3656 |
| 10,741,792 B2* | 8/2020 | Guo | H10K 50/8445 |
| 10,797,983 B1* | 10/2020 | Singh | H04L 63/0254 |
| 11,405,272 B1* | 8/2022 | Khan | H04L 41/0627 |
| 11,481,194 B1* | 10/2022 | Chowdhary | G06F 8/30 |
| 11,558,265 B1* | 1/2023 | Poornachandran | H04L 41/5009 |

OTHER PUBLICATIONS

Collins et al, "Crossfire—Multiprocess, Cross-Browser, Open-Web Debugging Protocol", ACM, pp. 115-123 (Year: 2011).*
Riedel et al, "Enhancing Scientific Workflows with Secure Shell Functionality in UNICORE Grids", IEEE, pp. 1-8 (Year: 2005).*
Layman et al, "Debugging Revisited", IEEE, pp. 383-392 (Year: 2013).*
Lee et al, "Debug All Your Code: Portable Mixed-Environment Debugging", ACM, pp. 207-225 (Year: 2009).*
Pineo et al, "Debugging Parallelized Code Using Code Liberation Techniques", ACM, pp. 108-119 (Year: 1991).*
Li et al, "Debug Information Validation for Optimized Code", ACM, pp. 1052-1065 (Year: 2020).*

* cited by examiner

REMOTE DEBUGGING OF CLOUD APPLICATION

BACKGROUND

Debugging is a process of removing bugs (errors and other problems) from software code. There are multiple ways to remove bugs including scanning your code for typographical errors, executing a code analyzer to spot predefined issues, performance profiling, and the like. Another way to debug your code is to use a debugger. A debugger is a specialized tool that attaches to an application and allows you to inspect the corresponding code of the application for bugs. For example, a debugger may allow the user to step through the code and look at the values stored in variables, set watches on variables to see when values change, examine the execution path of the code, and the like.

Many organizations run their software on-premises (e.g., via an on-premises server). This enables the developers/IT professionals to debug the application in its native environment (i.e., at the on-premises server). However, with the recent advances in cloud computing, many organizations have begun moving traditional on-premises applications to the cloud. To debug a cloud application, developers typically analyze logs on the cloud platform that are captured from the cloud runtime environment and try to reproduce/fix the errors on a local machine. However, there are many issues that can occur with the software that need to be debugged that cannot be fully understood from logs. That is, some issues are not replicable out of the cloud environment. For example, complex functions such as when the application accesses services that are hosted by the customer (e.g., on-premises). In this case, you need to debug the communications from the cloud runtime environment to the on-premises customer server, which cannot be duplicated from a local machine.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

DETAILED DESCRIPTION

Figure 1:
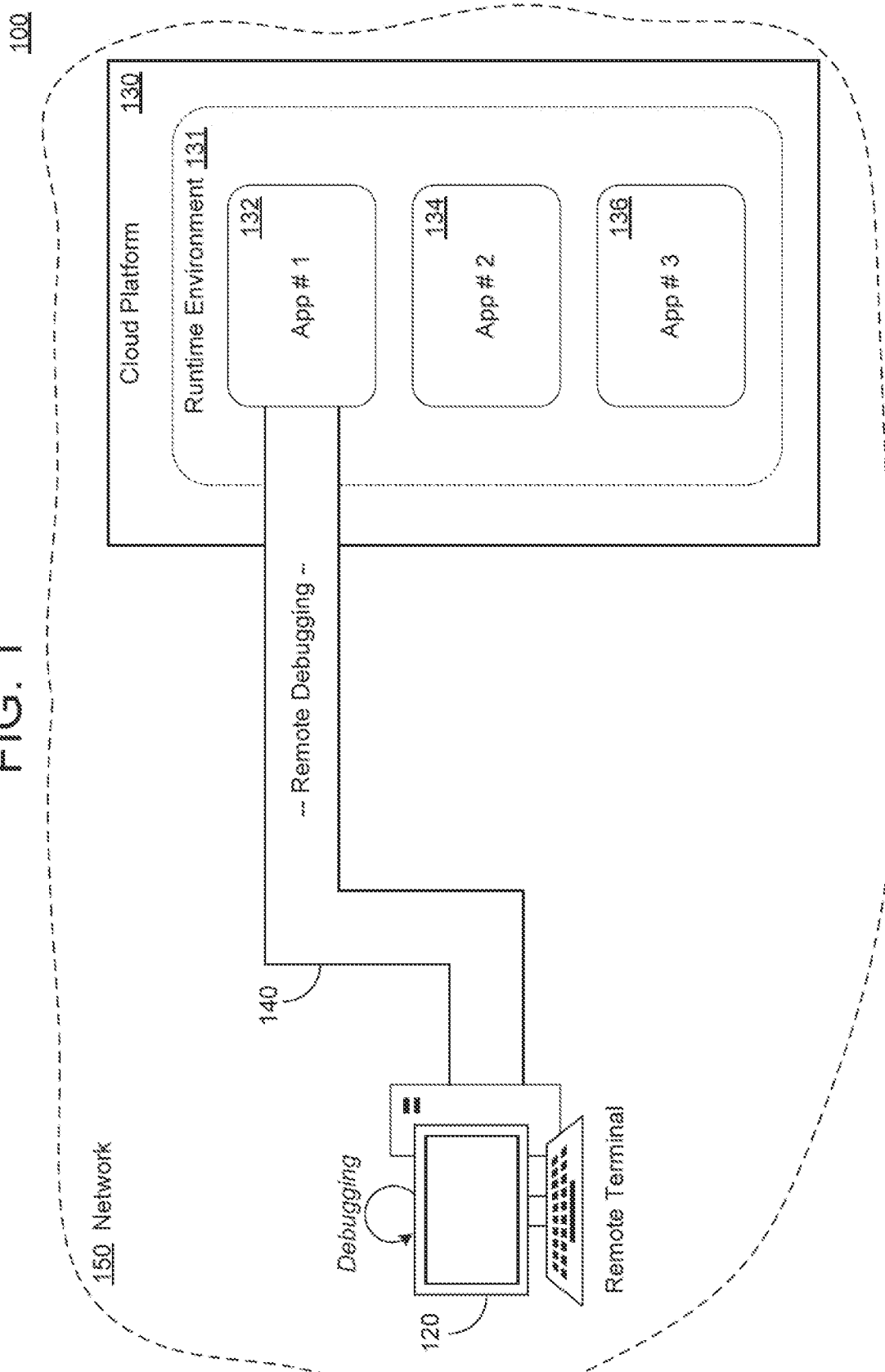
FIG. 1 is a diagram illustrating a computing environment for remoting debugging of a cloud application in accordance with an example embodiment.

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a remote debugging process which enables a remote terminal (e.g., desktop computer, server, cloud platform, etc.) to connect to a software application running on a cloud platform and debug the software application in its native cloud environment. This process may be embodied as code that is provided to developers in advance or at the time of deploying their application at the cloud platform, for example, as part of a library or other predefined code sections.

One of the underlying technologies of the cloud platform is CLOUD FOUNDRY®. The CLOUD FOUNDRY® environment allows developers to create polyglot cloud applications in CLOUD FOUNDRY®. It contains the CLOUD FOUNDRY® runtime service, which is based on the open-source application platform managed by the CLOUD FOUNDRY FOUNDATION®. The CLOUD FOUNDRY® environment enables a software designer to develop new business applications and business services, supporting multiple runtimes, programming languages, libraries, and services. It is possible for a developer using CLOUD FOUNDRY® to leverage a multitude of buildpacks, including community innovations and self-developed buildpacks. CLOUD FOUNDRY® also integrates with extended application services of cloud providers, advanced models of cloud providers, and the like.

Cloud platforms let anyone deploy network applications or services and make them available to the world in a few minutes. When an application becomes popular, the cloud can scale the application (i.e., add more instances, etc.) to handle more traffic, and replace build-out and migration efforts that once took months with a few keystrokes. Cloud platforms enable a software developer to focus exclusively on the application and data without worrying about underlying infrastructure. Each instance of an application deployed to a runtime environment (e.g., such as provided by CLOUD FOUNDRY®, etc.) runs within its own self-contained environment, referred to as a container. The container isolates processes, memory, and the filesystem using operating system features and the characteristics of the virtual and physical infrastructure where the cloud is deployed.

The cloud platform achieves container isolation by namespacing kernel resources that would otherwise be shared. The intended level of isolation is set to prevent multiple containers that are present on the same host from detecting each other. Every container includes a private root filesystem, which includes a unique Process ID (PID), namespace, network namespace, and mount namespace. Furthermore, the cloud may create container filesystems using the Garden Rootfs (GrootFS) tool. Here, the cloud may generate a read-only base filesystem that has a minimal set of operating system packages and specific modifications common to all containers. Containers can share the same read-only base filesystem because all writes are applied to the read-write layer. The cloud may also generate a container-specific read-write layer. This layer is unique to each container and its size is limited by project quotas. The quotas prevent the read-write layer from overflowing into unallocated space.

Each container is placed in its own "group", or cgroup. Groups make each container use a fair share of a central processing unit (CPU) relative to the other containers in the group. This prevents oversubscription on the host virtual machine (VM) where one or more containers overuse the CPU and leave no computing resources to the others.

Meanwhile, an "org" is a development account that an individual or multiple collaborators can own and use. All collaborators access an org with user accounts, which have roles such as Org Manager, Org Auditor, and Org Billing Manager. Collaborators in an org share a resource quota plan, apps, services availability, and custom domains. By default, an org has the status of active. An admin can set the status of an org to suspended for various reasons such as failure to provide payment or misuse. When an org is suspended, users cannot perform certain activities within the org, such as push apps, modify spaces or hind services.

In addition, a "space" provides users with access to a shared location for application development, deployment, and maintenance. An org can contain multiple spaces. Spaces may represent subgroups within an "org" that can be used to organize applications, services, and users. Spaces may include a runtime environment, storage, processing capabilities, and the like. Every application, service, and route is scoped to a space. Roles provide access control for these resources and each space role applies only to a particular space. For example, a "user" is a role with basic permissions in orgs and spaces. A user must be assigned to an org before the are able to grant other permissions to a space within the org.

Meanwhile, "domains" provide the route on the internet that is allocated to the org. A route has a subdomain and a domain. A subdomain is typically the application name. A domain might be a system domain or a custom domain that you registered for your application.

A developer may configure a domain name space (DNS) server to resolve a custom domain to point to the cloud system domain. In this way, when the cloud receives a request for a custom domain, it can properly route it to the corresponding application.

A "quota" represents the resources that are available to an org, including the number of services and the amount of memory that can be allocated for use by the org. Quotas are assigned when orgs are created. Any application or service in a space within an org contributes to the usage of the quota. The quota for cloud applications can be adjusted as the needs of an org change.

CLOUD FOUNDRY® also provides a command line interface (CLI) that is capable of receiving inputs from a user (e.g., text inputs) and submitting the commands to the cloud application. For example, CLI can be used to manage applications, service instances, orgs, spaces, and users in an environment. A login command (cf login) uses syntax to specify a target API endpoint, login credentials, an org, and a space. If a user is a member of multiple orgs or spaces, the cf login nay prompt the user for which orgs and/or spaces to log into. Otherwise, for example if the user is only a participant of one or and one space, cf login targets the org and space of the user automatically without requiring the user to specify the space or the org.

Traditionally, applications were developed and hosted by "on-premises" systems which requires the customer to perform all the installation, maintenance, debugging, etc. of a software application, as well as host the application. Recently, organizations have begun moving their applications and data from an on-premises environment to a cloud environment. The cloud platform includes a different runtime environment than the on-premises systems. For example, the cloud platform may include a JavaScript (Node.js runtime) environment, or the like.

It's very difficult to debug an application that is already running in the cloud platform. The usual way of debugging is analyzing the logs on the cloud platform (from the runtime) and trying to figure out the issues from the log. However, there are many situations/issues that can occur that cannot be fully understood or fixed simply from log data. That is, some issues are only replicable in the cloud environment. A user can try and download the code and reproduce the issue locally on their machine. However, certain more complex functions cannot be replicated such as when the application accesses services that are hosted by the customer (e.g., on-premises). In this case, you need to debug the communications from the cloud runtime environment to the on-premises customer server, which cannot be duplicated from a local machine.

To address this problem in the art, the example embodiments enable a tunnel to be established between a cloud application running in a container on a virtual machine of the cloud platform, and a remote terminal. The tunnel may be a secure shell (SSH) tunnel that is created by logging into the cloud runtime environment (e.g., CLOUD FOUNDRY®, etc.) Here, the user can issue commands via the command line interface of the cloud environment. The commands may enable the SSH tunnel, establish port forwarding from a port of the remote terminal to a corresponding port at the virtual machine where the application is being hosted, and attach a debugger to the port of the remote terminal. Once attached, the debugger can send and receive commands (via port forwarding on the established SSH channel) to the software application in the cloud environment enabling the remote terminal to debug the application in its native cloud environment.

FIG. 1 illustrates a computing environment 100 for remoting debugging of an application 132 in accordance with an example embodiment. Referring to FIG. 1, a cloud platform 130 hosts a plurality of applications 132, 134, and 136 which are each part of the same "org" and hosted in a different "space" of the cloud platform 130. Meanwhile, a remote terminal 120 may connect to the cloud platform 130 and log into the runtime environment 131 of the cloud platform. For example, the remote terminal 120 may be a desktop computer, a laptop, a notebook, a server, another cloud platform, and the like. The remote terminal 120 may log into the runtime environment 131 (e.g., CLOUD FOUNDRY®, etc.) Next, the remote terminal 120 may establish a tunnel 140 between the remote terminal 120 and the application 132 on the cloud platform 130, via a network 150, according to the example embodiments. Here, the remote terminal 120 may enter commands into the CLI of the runtime and specify the application 132 and its corresponding space and thereby connect to the application 132.

Once connected to the application 132 via the tunnel 140, the remote terminal 120 may attach a debugger to a port of the remote terminal 120. The debugger may receive commands from a user inputting commands on the remote terminal 120 (e.g., via a keyboard, mouse, touch screen, speech, etc.) and forward the commands to the application 132 on the cloud platform 130. The resulting response from the application 132 may be returned back to the debugger at the remote terminal 120 thereby providing the debugging data to the remote user. For example, the debugger can be used to remotely debug cloud-specific functions, services, messaging, etc. that cannot typically be debugged without the cloud platform. That is, the debugger can perform debugging as if the remote terminal 120 were local (at the cloud platform 130.) The results of the debugging may be displayed via a user interface (not shown) on the remote terminal 120. Thus, a user can review the debugging results, issue more commands, and decide when the debugging has completed.

Figure 2:
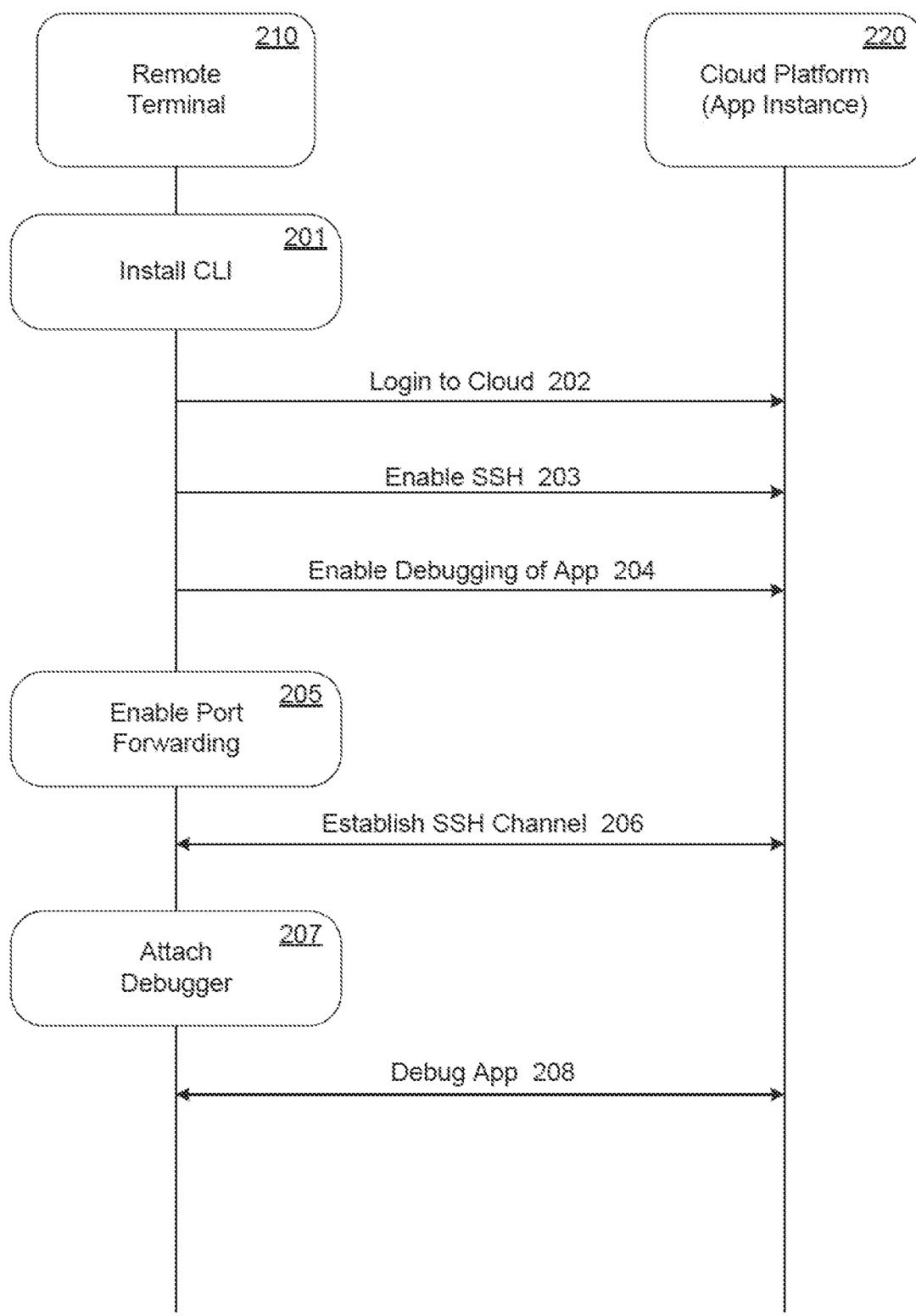
FIG. 2 is a diagram illustrating a communication sequence between a remote terminal and a cloud platform when performing remote debugging in accordance with an example embodiment.

In order to establish the tunnel 140 and perform the remote debugging as described in the examples herein, the remote terminal 120 may perform a process as further described herein with respect to a communication sequence 200 as shown in FIG. 2. The communication sequence 200 may be automated (e.g., automatically performed by a service, library, function, code segment, application, etc.) located at the remote terminal 120 which communicates with the cloud platform 130. As another example, the communication sequence 200 may be performed by a human entering commands into an interface on the remote terminal 120.

Referring to FIG. 2, the communication sequence 200 is performed between a remote terminal 210 and a cloud platform 220 for performing remote debugging in accordance with an example embodiment. In this example, the remote terminal 210 and the cloud platform 220 may correspond to the remote terminal 120 and the cloud platform 130, in FIG. 1. In this example, the remote terminal 210 may authenticate to the cloud platform 220, connect to an application instance on the cloud platform 220, enable remote debugging on the application instance, enable port forwarding, and attach a debugger to a process running on the application instance for remotely debugging the application instance on the cloud platform 220 via the remote terminal 210 while the application instance is running on the cloud platform 220.

In 201, the remote terminal 210 may install the command line interface (CLI) of the cloud runtime such as CLOUD FOUNDRY®, etc. Here, the remote terminal 210 may add a CLOUD FOUNDRY FOUNDATION® public key and package repository to the remote terminal 210, update the local package, and install the command line interface using nay predefined mechanisms/methods known in the art. For example, the command "sudo apt-get install cf-cli" will install CLOUD FOUNDRY® CLI 6 at a directory of the remote terminal 210. Furthermore, the installation can be verified by additional commands. If the installation is successful, the version of the CLI that is installed (e.g., version 6, version 7, etc.) may be displayed via the CLI.

In 202, the remote terminal logs into the application instance (e.g., application 132, etc.) running on the cloud platform 220. As an example, the remote terminal may submit the following command:

cf login [-a API-URL] [-o ORG] [-s SPACE] [--sso]

Here, the "API-URL" is an endpoint of the application instance in the runtime environment of the cloud platform 220, "ORG" is the name of the organization where the application instance is deployed on the cloud platform 220, "SPACE" is the space in the organization within the organization (org) where the application is deployed and may map to teams, products, applications, roles, etc. Meanwhile, "sso" is a prompt for a one-time passcode to log in to the application instance. As an example, the cloud provider may provide the one-time passcode as a single sign-on for safely logging into the application instance. For a user of the remote terminal 210, the organization name, the API-URL, and the space may all be identified from and provided by an account settings page or cockpit provided by the cloud provider of the cloud platform 220.

After running the above-command, the cloud runtime environment may prompt the user (or automated bot, etc.) for a one-time passcode which may be entered via a web browser or other resource with a URL. Here, the cloud provider may send a temporary or one-time use password to the user via email, message, etc., or just add it via a software process on the remote terminal 210 into the web browser.

CLOUD FOUNDRY® enables users to use secure shell (SSH) to connect to application instances running on the cloud from a remote terminal. SSH is a cryptographic network protocol for operating network services securely over an unsecured network. In some cases, the application instance may not be enabled for SSH. In this case, in 203, the remote terminal 210 may enable SSH for the application instance on the cloud platform 220. Below is an example of a command which checks whether an application is accessible via SSH:

$ cf ssh-enabled myapp

Here, "myapp" corresponds to the name of the application instance that is targeted by this command. In this case, if the application is not SSH accessible, a notification may be output via the command line and the remote terminal 210 may enable SSH connections with the following command:

$ cf ssh-enable myapp

Here, the cloud platform 220 may respond with a notice indicating that SSH support is enabled/enabling via an email account, etc. Accordingly, the remote terminal 210 can tunnel to application instances unless an org/space manager has prohibited this access. The cf ssh-enabled command checks whether an application is accessible via SSH. In this case, if the application isn't accessible via SSH, it can be enabled with the command cf enable-ssh. Note that if a space manager disabled the access at the space level, all the applications that are part of this space would inherit the access level, and the remote terminal 210 (running by a developer) won't be able to SSI-1 to an individual application container even if SSH access is enabled at the application level. If SSH access is allowed at the deployment, space, and application level, the remote terminal 210 can run the SSH enable command to start an interactive SSH session with the VM container hosting the application.

Within the cloud platform a process (e.g., Node.js) may be associated with the application instance. For example, the Node.js process may be responsible for running the application instance on the cloud platform 220. In 204, the remote terminal 204 may enable debug mode for the Node.js process. To enable debug mode for a running Node.js process, the remote terminal 210 can use a unique process ID (PID) of the Node.js process. On Linux and Unix-like environments, the ps command gives the unique process ID of the Node.js process. Once the PID of the Node.js process running the application is known, the remote terminal 210 can use a kill command to send a debugging signal to this process. The Node.js runtime activates an inspector protocol when it receives a usr1 signal as shown below. The inspector protocol is a debugging protocol that allows tools to instrument, inspect, debug, and profile.

vcap@afa9bea3-b619-6476-5e97-1328:~$ kill -usr1 151

Here, the identifier '151' is the process ID of the Node.js process, 'usr1' is the user signal from the remote terminal 210, and 'vcap' is the user account. Once enabled, the debugger starts listening on a port associated with the command. For example, the port may be defined in advance in a settings menu, etc., or it may be defined by the command. After sending the above-identified signal to the Node.js process, the debugger may start listening on the identified port, for example, port 9229 or some other port. Here, the Node.js process is switched into debug mode and starts listening for debugging request on a WebSocket server at the host and port 127.0.0.1:9229.

In 205, the remote terminal 210 may enable port forwarding which forwards any transmission control protocol (TCP) requests detected by the debugger via the identified port, and forwards them to a corresponding port of the application instance. In this case, the port may be the same numbered port or a different numbered port as the port from the port which the debugger is listening to at the remote terminal 210.

With port forwarding (also referred to as port mapping), the remote terminal 210 can redirect TCP requests from the development machine (i.e., remote terminal 210) to an application instance running on a virtual machine in the cloud platform 220. In CLOUD FOUNDRY®, port forwarding works by creating a listening TCP port on remote terminal 210 that maps to a TCP port on the VM where the application is running in the cloud platform 220 via a secure SSH channel. When using the cf ssh command, the -L flag enables local port forwarding, binding an output port on the remote terminal 210 to an input port on the application virtual machine in the cloud platform 220. The command may pass a local port number and an application VM port and port number, all colon-delimited. The command can also include a local network interface prepended thereto, or use a default local host. Below is just an example of the port forwarding command:

$ cf ssh MY-APP -L [LOCAL-NETWORK-INTERFACE:]LOCAL-PORT:REMOTE-HOST-NAME:REMOTE-HOST-PORT As an example, the port forwarding command may be "cf ssh -N -L 9229:127.0.0.1:9229 my app" which maps port 9229 on the remote terminal 210 to a port 9229 on the virtual machine where the application instance is running in the cloud platform 220. This starts an SSH tunnel session between the remote terminal 210 and the cloud platform 220 where a connection to port 9229 on the remote terminal 210 is established and used to forward TCP requests to my app (application instance) on port 9229 of the virtual machine of the cloud platform 220.

As a result of the port forwarding in 205, in 206 a SSH connection/channel is established between port 9229 of the remote terminal 210 and port 9229 of a virtual machine. Furthermore, in 207, the remote terminal 210 attaches a debugger to the port on which port forwarding has been set on the remote terminal 210. For example, the debugger may be any known debugger in the art such as Visual Studio Code, Chrome Dev Tools, etc. An example of the SSH connection between the remote terminal 210 and the cloud platform 220 is further described with respect to FIG. 3. In 208, the remote terminal 210 performs debugging of the application hosted on the cloud platform 220 via the SSH tunnel that is created between the ports and the debugger that is attached to the other side of the SSH tunnel. Debugging may include various operations such as control flow analysis, unit testing, integration testing, monitoring of the application or system, memory dumps, profiling, and the like.

Figure 3:
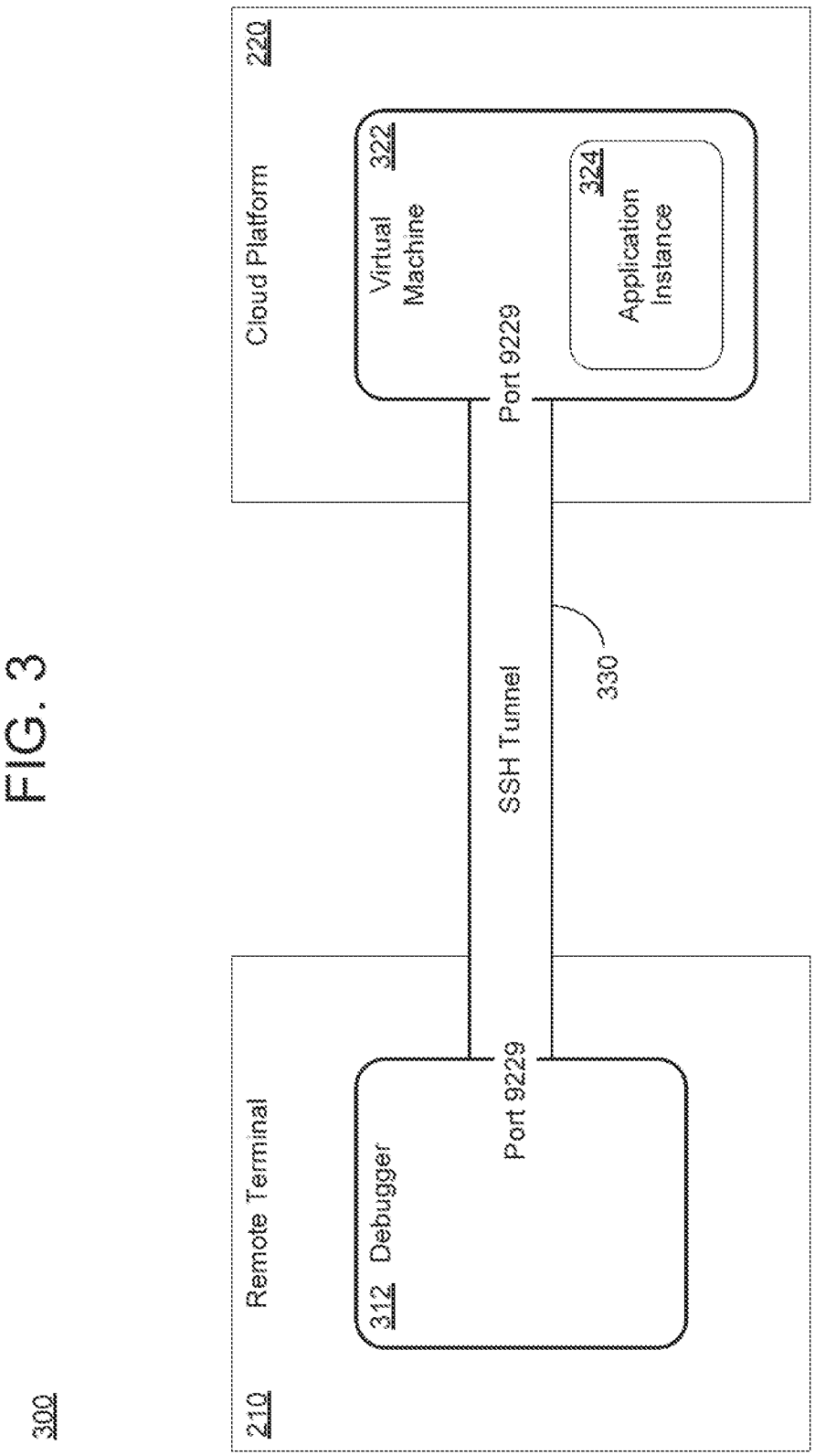
FIG. 3 is a diagram illustrating a process of establishing a SSH channel for remote debugging in accordance with an example embodiment.

Referring to FIG. 3, a process 300 is illustrated in which a SSH channel 330 (port-to-port) for remote debugging is established between a debugger 312 running on the remote terminal 210 and a virtual machine 322 running on the cloud platform 220. Here, the virtual machine 322 is hosting an application instance 324 that is being developed or otherwise having maintenance performed via the remote terminal 210. Here, the SSH channel 330 is established between port 9229 on the remote terminal 210 and port 9229 of the virtual machine 322 hosting the application instance 324.

For most debugging scenarios, creating a launch configuration file is beneficial because it allows the developer to configure and save debugging setup details. Visual Studio Code keeps debugging configuration information in a launch.json file located within a .vscode folder in a user's workspace (project root folder), user settings, or workspace settings of the user of the remote terminal 210.

Figure 4:
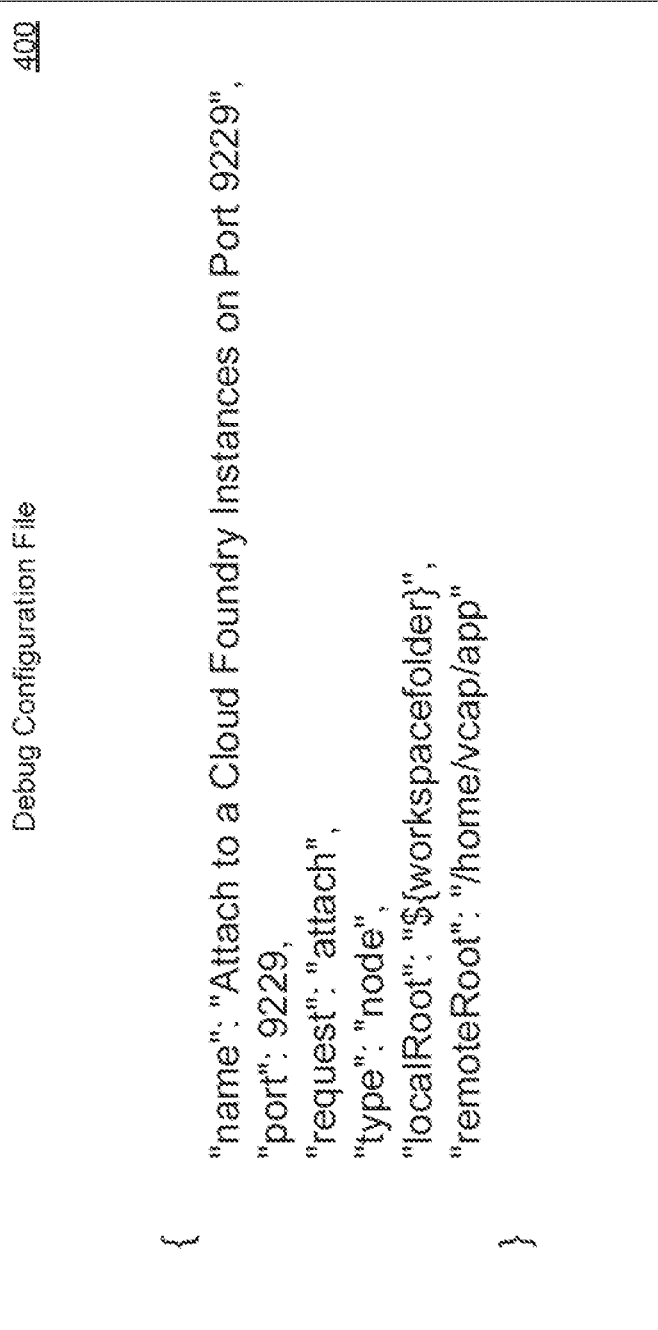
FIG. 4 is a diagram illustrating a code for attaching a debugging node for remote debugging in accordance with an example embodiment.

FIG. 4 illustrates an example of a code segment 400 that can be integrated within a debugging configuration file such as the launch.json file provided by Visual Studio Code. Here, the code segment 400 includes a name of the debugger, a port of the remote terminal 210 where the debugger is to be attached, a request (i.e., attach the debugger), a type of entity, in this case a node, a local root where the information is to be saved, and an application (remoteRoot) where the debugging commands are to be forwarded. It should also be appreciated that the debugger may be something other than Visual Studio Code. For example, the debugger may be a Chrome Dev Tools debugger. In any case, the debugger can be attached to the port, but the manner in which it is performed may vary from one debugger to the next.

Referring again to FIG. 2, once the debugger is attached in 207, the developer on the remote terminal 210 may begin debugging the application instance hosted on the cloud platform 220. For example, debugging commands, instructions, etc., may be sent into a command line interface or other user interface associated with the debugger, and the commands may be forwarded by the remote terminal 210 to the application instance on the cloud platform 220. The results of the debugging may be returned back to the debugger on the remote terminal 210. Thus, a user can remotely debug the cloud application while it is running in its native cloud environment thereby enabling debugging of cloud-specific functionality and services that cannot be performed when the cloud application is downloaded and debugged locally or by analyzing log data. Thus, a more thorough debugging process can be performed in an efficient manner.

Figure 5:
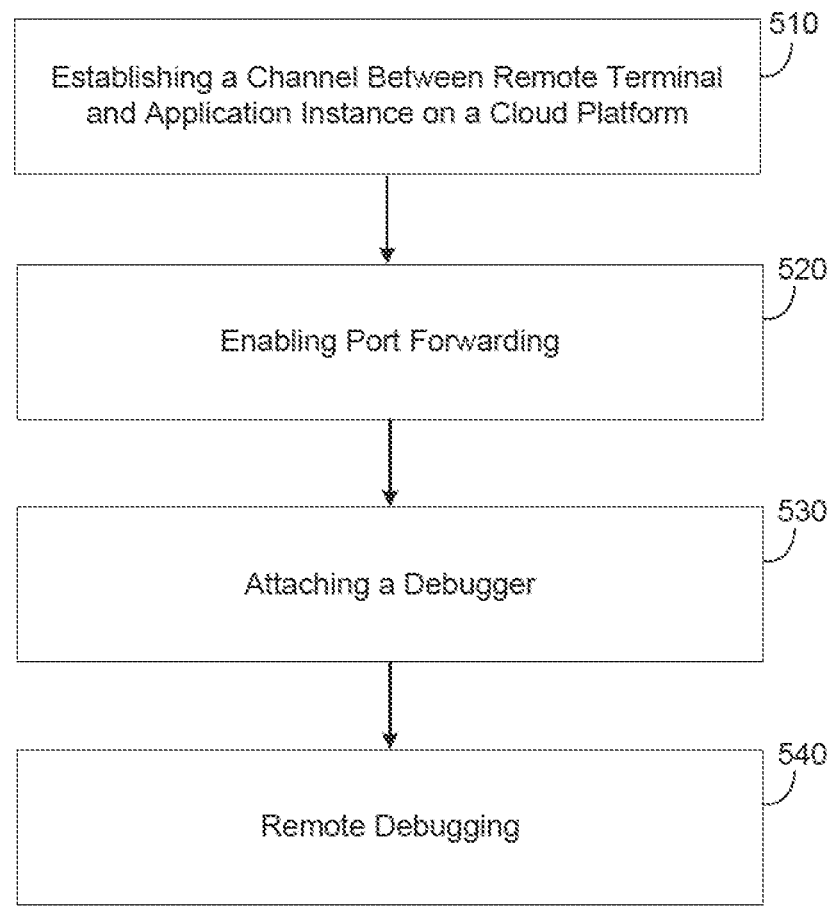
FIG. 5 is a diagram illustrating a method of remotely debugging a cloud application in accordance with an example embodiment.

FIG. 5 illustrates a method 500 of remotely debugging a cloud application in accordance with an example embodiment. As an example, the method 500 may be performed by a remote terminal such as a desktop computer, an on-premises server, a cloud platform, a mobile device, or the like. The method 500 may be an automated method that is performed by a software application, a bot, etc., without the user having to type in commands, etc. In other words, the commands may be predefined and issued by the software application during remote debugging. Referring to FIG. 5, in 510, the method may include establishing a communication channel between a remote computing terminal and an application instance hosted on a cloud platform. For example, a tunnel such as an SSH tunnel may be established between the remote computing terminal and the application instance on the cloud platform. The tunnel enables the remote terminal to connect directly to the application instance via a cloud runtime environment such as Cloud Foundry.

In 520, the method may include enabling port forwarding at the remote computing terminal to redirect requests from the remote computing terminal to the application instance hosted on the cloud platform via the communication channel. The port forwarding may instruct the debugger to capture and send debugging instructions entered at the remote computing terminal to the application instance on the cloud platform. In 530, the method may include attaching a debugger to a port at the remote computing terminal that is associated with the communication channel. In 540, the method may include forwarding, via the debugger, debugging commands input at the remote computing terminal to the application instance hosted on the cloud platform via the communication channel.

In some embodiments, the method may further include logging in to a cloud runtime environment (e.g., Cloud Foundry, etc.) on the cloud platform prior to establishing the communication channel. In some embodiments, the establishing may include establishing a secure shell (SSH) channel between a port of the remote computing terminal and a port of a virtual machine which is hosting the application instance on the cloud platform. In some embodiments, the establishing may further include enabling SSH accessibility for the application instance on the cloud platform via a command from the remote computing terminal. In some embodiments, the method may further include enabling remote debugging on the application instance hosted on the cloud platform via submission of a predefined command that identifies the application instance and sends a remote debugging signal to the application instance.

In some embodiments, the forwarding may include listening for and forwarding, via the debugger, transmission control protocol (TCP) requests entered via a command line of the remote computing terminal to the application instance on the host platform. In some embodiments, the listening and the forwarding may include listening for and forwarding TCP requests via a numbered port on the remote computing terminal to a same-numbered port on a virtual machine where the application instance is hosted on the cloud platform. In some embodiments, the method may further include receiving, via the debugger, a debugging response of the application instance that is hosted on the cloud platform via the established communication channel, and displaying the results via a user interface on the remote computing terminal.

Figure 6:
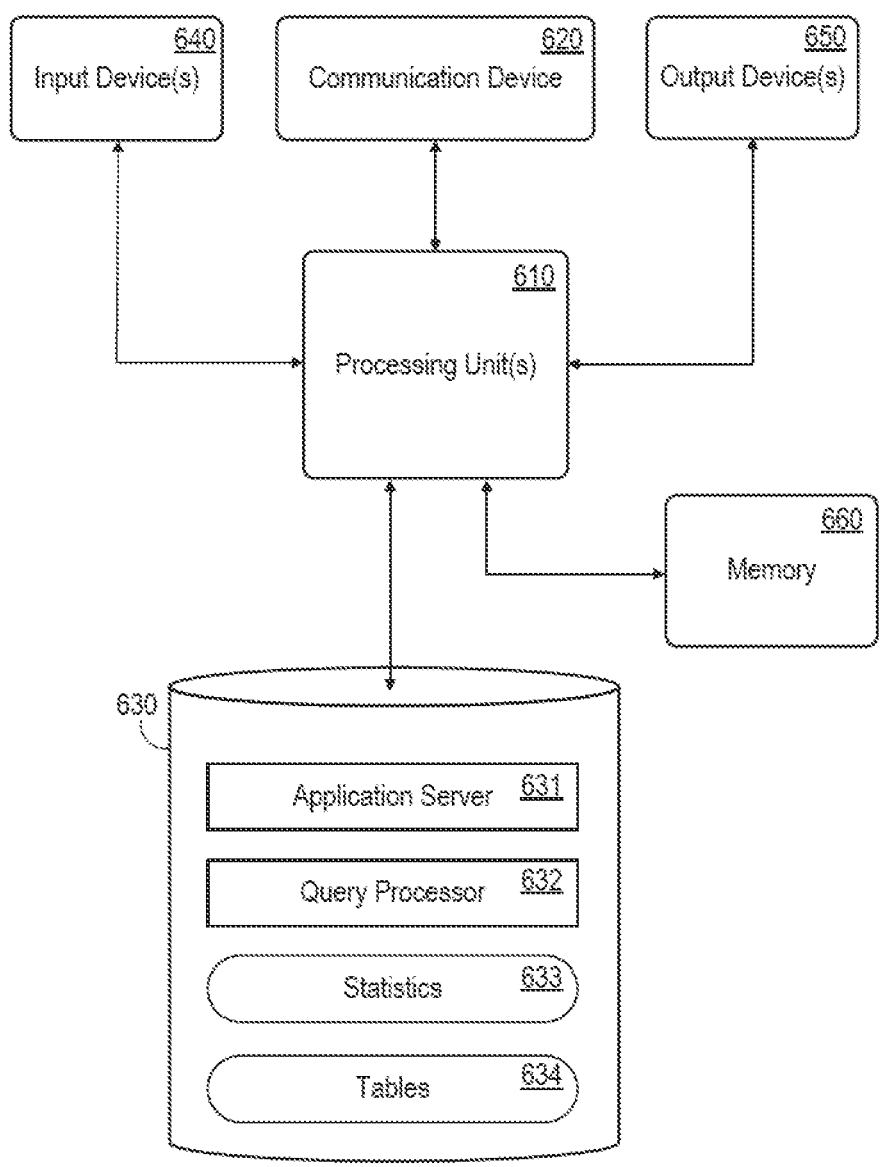
FIG. 6 is a diagram illustrating a computing system for use with any of the examples herein in accordance with an example embodiment Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

FIG. 6 is a diagram of a server node 600 according to some embodiments. The server node 600 may include a general-purpose computing apparatus and may execute program code to perform any of the functions described herein. The server node 600 may comprise an implementation of a remote terminal or a host platform, in some embodiments. It should also be appreciated that the server node 600 may include other unshown elements according to some embodiments and may not include all of the elements shown in FIG. 6.

Server node 600 includes processing unit(s) 610 (i.e., processors) operatively coupled to communication device 620, data storage device 630, input device(s) 640, output device(s) 650, and memory 660. Communication device 620 may facilitate communication with external devices, such as an external network or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into the server node 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM). In some embodiments, the data storage device 630 may store user interface elements in tabular form. For example, one or more columns and one or more rows of user interface elements may be displayed in a two-dimensional spreadsheet, table, document, digital structure, or the like.

Application server 631 and query processor 632 may each comprise program code executed by processing unit(s) 610 to cause server node 600 to perform any one or more of the processes described herein. Such processes may include estimating selectivities of queries on tables 634 based on statistics 633. Embodiments are not limited to execution of these processes by a single computing device. Data storage device 630 may also store data and other program code for providing additional functionality and/or which are necessary for operation of server node 600, such as device drivers, operating system files, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a network interface configured to establish a network communication channel between a port at the computing system and an application instance hosted in a runtime environment of a remote cloud platform via a corresponding port at the remote cloud platform; and
   a processor configured to
      log into the application instance in the runtime environment of the remote cloud platform via the established network communication channel;
      attach a debugger to the port at the computing system;
      submit a command which enables port forwarding from the port at the computing system to the application instance within the runtime environment of the remote cloud platform via the network communication channel;
      submit a command from the computing system to the remote cloud platform to enable accessibility for the application instance on the remote cloud platform based on a cryptographic network protocol;
      receive, by the debugger, debugging commands for debugging code of the application instance while logged into the application instance within the runtime environment; and
      forward the debugging commands to the application instance within the runtime environment on the remote cloud platform via the port at the computing system and the corresponding port at the remote cloud platform based on the enabled port forwarding, and
      execute the debugging commands within the runtime environment on the remote cloud platform.

2. The computing system of claim 1, wherein the processor is further configured to log into the runtime environment on the remote cloud platform via a command line interface (CLI) of the remote cloud platform.

3. The computing system of claim 1, wherein the processor is configured to establish a secure shell (SSH) tunnel between the port at the computing system and a port of a virtual machine which is hosting the application instance within the runtime environment of the remote cloud platform.

4. The computing system of claim 3, wherein the processor is further configured to submit a command from the computing system to the remote cloud platform to enable secure shell (SSH) accessibility for the application instance on the remote cloud platform.

5. The computing system of claim 1, wherein the processor is further configured to submit a predefined command that identifies a process for running the application instance to enable remote debugging for the application instance hosted on the remote cloud platform.

6. The computing system of claim 1, wherein the processor is configured to listen for and forward, via the debugger, transmission control protocol (TCP) requests entered via a command line of the computing system to the application instance on the remote cloud platform.

7. The computing system of claim 6, wherein the processor is configured to listen for and forward TCP requests via a numbered port of the computing system over a computer network to a same-numbered port on a virtual machine where the application instance is hosted on the remote cloud platform.

8. The computing system of claim 1, wherein the processor is further configured to receive, via the debugger, a debugging response from the application instance hosted on the remote cloud platform via the network communication channel between the port at the computing terminal and the corresponding port at the remote cloud platform.

9. A method comprising:
   establishing a network communication channel between a port at a computing system and an application instance hosted in a runtime environment of a remote cloud platform via a corresponding port at the remote cloud platform;
   logging into the application instance in the runtime environment of the remote cloud platform via the established network communication channel;
   attaching a debugger to the port at the computing system;
   submitting a command which enables port forwarding from the port at the computing system to the application instance within the runtime environment of the remote cloud platform via the network communication channel;
   submitting a command from the computing system to the remote cloud platform to enable accessibility for the application instance on the remote cloud platform based on a cryptographic network protocol;
   receiving, by the debugger, debugging commands for debugging code of the application instance while logged into the application instance within the runtime environment; and
   forwarding the debugging commands to the application instance within the runtime environment on the remote cloud platform via the port at the computing system and the corresponding port at the remote cloud platform based on the enabled port forwarding, and
   executing the debugging commands within the runtime environment on the remote cloud platform.

10. The method of claim 9, wherein the method further comprises logging into the runtime environment on the remote cloud platform via a command line interface (CLI) of the remote cloud platform.

11. The method of claim 9, wherein the establishing comprises establishing a secure shell (SSH) tunnel between the port at the computing system and a port of a virtual machine which is hosting the application instance within the runtime environment of the remote cloud platform.

12. The method of claim 11, wherein the establishing comprises submitting a command from the computing system to the remote cloud platform to enable secure shell (SSH) accessibility for the application instance on the remote cloud platform.

13. The method of claim 9, wherein the method further comprises submitting a predefined command that identifies a process for running the application instance to enable remote debugging for the application instance hosted on the remote cloud platform.

14. The method of claim 9, wherein the forwarding comprises listening for and forwarding, via the debugger, transmission control protocol (TCP) requests entered via a command line of the computing system to the application instance on the remote cloud platform.

15. The method of claim 14, wherein the listening and forwarding comprise listening for and forwarding TCP requests via a numbered port of the computing system to a same-numbered port on a virtual machine where the application instance is hosted on the remote cloud platform.

16. The method of claim 9, wherein the method further comprises receiving, via the debugger, a debugging response from the application instance hosted on the remote cloud platform via the network communication channel between the port at the computing terminal and the corresponding port at the remote cloud platform.

17. A non-transitory computer-readable medium comprising program instructions which when executed by a processor cause a computer to perform a method comprising:
    establishing a network communication channel between a port at a computing system and an application instance hosted on a remote cloud platform via a corresponding port at the remote cloud platform;
    logging into the application instance in the runtime environment of the remote cloud platform via the established network communication channel;
    attaching a debugger to the port at the computing system;
    submitting a command which enables port forwarding from the port at the computing system to the application instance within the runtime environment of the remote cloud platform via the network communication channel;
    submitting a command from the computing system to the remote cloud platform to enable accessibility for the application instance on the remote cloud platform based on a cryptographic network protocol;
    receiving, by the debugger, debugging commands for debugging code of the application instance while logged into the application instance within the runtime environment; and
    forwarding, via the debugger, the debugging commands to the application within the runtime environment on the remote cloud platform via the port at the computing system and the corresponding port at the remote cloud platform based on the enabled port forwarding, and
    executing the debugging commands within the runtime environment on the remote cloud platform.

18. The non-transitory computer-readable medium of claim 17, wherein the method further comprises logging into the runtime environment on the remote cloud platform via a command line interface (CLI) of the remote cloud platform.

19. The non-transitory computer-readable medium of claim 17, wherein the establishing comprises establishing a secure shell (SSH) tunnel between the port at the computing system and a port of a virtual machine which is hosting the application instance within the runtime environment of the remote cloud platform.

20. The non-transitory computer-readable medium of claim 19, wherein the establishing further comprises submitting a command from the computing system to the remote cloud platform to enable secure shell (SSH) accessibility for the application instance on the remote cloud platform.

* * * * *